(12) United States Patent
Wooters et al.

(10) Patent No.: US 12,266,037 B2
(45) Date of Patent: Apr. 1, 2025

(54) SYSTEMS AND METHODS FOR VISUALIZING PROBLEM AREAS OF AN AUTOMATED QUESTION ANSWERING SYSTEM

(71) Applicant: ADA Support Inc., Toronto (CA)

(72) Inventors: Charles Wooters, Livermore, CA (US); Yochai Konig, San Francisco, CA (US); Christos Melidis, Central Macedonia (GR); Arnon Mazza, Givatayim (IL); George Seif, Toronto (CA); Chen Qian, Kitchener (CA); Ives José de Albuquerque Macêdo, Jr., North Vancouver (CA); Jérôme Solis, Montreal (CA)

(73) Assignee: ADA SUPPORT INC., Toronto (CA)

( * ) Notice: Subject to any disclaimer, the term of this patent is extended or adjusted under 35 U.S.C. 154(b) by 221 days.

(21) Appl. No.: 17/943,023

(22) Filed: Sep. 12, 2022

(65) Prior Publication Data

US 2024/0087187 A1 Mar. 14, 2024

(51) Int. Cl.
| | |
|---|---|
| *G06F 40/00* | (2020.01) |
| *G06F 40/30* | (2020.01) |
| *G06F 40/35* | (2020.01) |
| *G06T 11/20* | (2006.01) |
| *G10L 15/18* | (2013.01) |
| *G10L 15/183* | (2013.01) |

(52) U.S. Cl.
CPC ............ *G06T 11/206* (2013.01); *G06F 40/30* (2020.01); *G06F 40/35* (2020.01); *G10L 15/1822* (2013.01); *G10L 15/183* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/1822; G10L 15/183; G10L 15/19; G10L 15/193; G10L 15/16; G10L 25/27; G10L 25/30; G10L 19/005; G10L 19/00; G10L 15/14; G10L 15/197; G10L 15/1815; G06F 40/30; G06F 40/268; G06F 40/284
See application file for complete search history.

(56) References Cited

U.S. PATENT DOCUMENTS

| | | | |
|---|---|---|---|
| 11,394,667 B2* | 7/2022 | Bobbarjung | H04L 51/02 |
| 11,734,579 B2* | 8/2023 | Neelamana | G06F 16/248 706/50 |
| 12,002,455 B2* | 6/2024 | Sridhar | G06V 30/274 |

OTHER PUBLICATIONS

U.S. Appl. No. 17/889,186, filed Aug. 16, 2022, entitled "Systems and Methods for Generating a Chatbot".

* cited by examiner

*Primary Examiner* — Vu B Hang
(74) *Attorney, Agent, or Firm* — Womble Bond Dickinson (US) LLP

(57) ABSTRACT

Systems and method for visualizing data for an automated question answering system are disclosed. The method includes identifying a first answer associated with a first query; identifying a second answer associated with a second query; determining a criterion of the first answer with respect to the second answer; and visually representing the first answer and the second answer based on the criterion.

14 Claims, 13 Drawing Sheets

| | Semantic Similarity Scores | | | | | |
|---|---|---|---|---|---|---|
| | A1 | A2 | A3 | B1 | B2 | B3 |
| A1 | | 0.5 | 0.4 | 0.3 | 0.2 | 0.8 |
| A2 | 0.5 | | 0.9 | 0.2 | 0.1 | 0.4 |
| A3 | 0.4 | 0.9 | | 0.1 | 0.2 | 0.3 |

FIG. 7

| response_id | description |
|---|---|
| 61096741c3ff9ebff2e33000 | Lockbox Troubleshooting |
| 61096ff7424f024a402c1076 | Adding a Property — 906a |
| 610994ee898865cc7726bfa | Keyless Smart Home |
| 610d9cca136ef1f2c07f34c0 | Missing Key |
| 6126b5f444d6e72bb2cdf2f3 | Delete Account |
| 6130f793de5cc50fe255a9b8 | Keyless Manager Support Handoff |
| 6137b8097c7bd0055dc4e300 | Multiple Card Charges |
| 613a46dacd1e50ea490ad4f | Key Doesn't work |
| 613a51c620111aac921ddcc7 | Section 8 |
| 613a52c499ce34f3cb5c3412 | Cancel my tour |
| 613a5a183ec29d7ff6f694f | Vandalised property |
| 613a685252lc5d1b7dd272 | Lockbox is Missing |

1 to 12 of 67  «  ‹ Page 1 of 6 ›  »

906

Adding a Property (61096ff7424f024a402c1076)

| score | question |
|---|---|
|  | — 908a |
| 0.26 | howdi add a property |
| 0.81 | I'd like to add a new property |
| 0.81 | How do I add a new property? |
| 0.81 | Adding a property |
| 0.82 | Howdi add a property |
| 0.82 | How to add a property |

908

FIG. 9B ers and methods for visualizing problem areas of an automated question answering system

FIELD

One or more aspects of embodiments according to the present disclosure relate to automated question answering systems, and more particularly to identifying problem areas of an automated question answering system.

BACKGROUND

A question answering system (hereinafter referred to as a chatbot or chatbot system) may be used for automatically engaging in a conversation with a user. The conversation may be for responding to questions by the user. Setup and maintenance of the chatbot for understanding the questions and formulating appropriate responses, however, may be challenging for a chatbot administrator.

The above information disclosed in this Background section is only for enhancement of understanding of the background of the present disclosure, and therefore, it may contain information that does not form prior art.

SUMMARY

One or more embodiments of the present disclosure are directed to a method for visualizing data for an automated question answering system. The method includes identifying a first answer associated with a first query; identifying a second answer associated with a second query; determining a criterion of the first answer with respect to the second answer; and visually representing the first answer and the second answer based on the criterion.

According to some embodiments, the method further includes determining a semantic relationship between the first query and the second query, wherein the determining the criterion includes determining that the semantic relationship between the first query and the second query is greater than a semantic relationship between the first query and another query associated with the first answer.

According to some embodiments, the criterion is indicative of the first answer being confused with the second answer.

According to some embodiments, the visually representing the first answer and the second answer includes displaying, in a network graph, a first node for the first answer, a second node for a second answer, and a directed edge connecting the first node and the second node, wherein a direction of the directed edge is indicative of a direction of confusion resulting from the first answer being confused with the second answer.

According to some embodiments, in response to determining the criterion, an action is recommended for addressing a confusion resulting from the first answer being confused with the second answer.

According to some embodiments, the first query and the second query are for training the automated question answering system.

According to some embodiments, the method further includes identifying a third query; determining that the third query is unassigned to an answer; and visually representing the third query based on the determining.

According to some embodiments, the method further includes identifying a third answer; determining a number of queries associated with the third answer; and visually representing the third answer based on the determining.

One or more embodiments of the present disclosure are also directed to a system for visualizing data comprising: a processor; and a memory. The memory stores instructions that, when executed by the processor, cause the processor to: identify a first answer associated with a first query; identify a second answer associated with a second query; determine a criterion of the first answer with respect to the second answer; and visually represent the first answer and the second answer based on the criterion.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 7 is a table of example semantic similarity scores computed by a data analysis system for determining whether answer A may be confused with answer B according to one embodiment;

FIGS. 9A-9B are screen shots of example screens for displaying additional details for a selected issue according to one embodiment;

DETAILED DESCRIPTION

Figure 1:
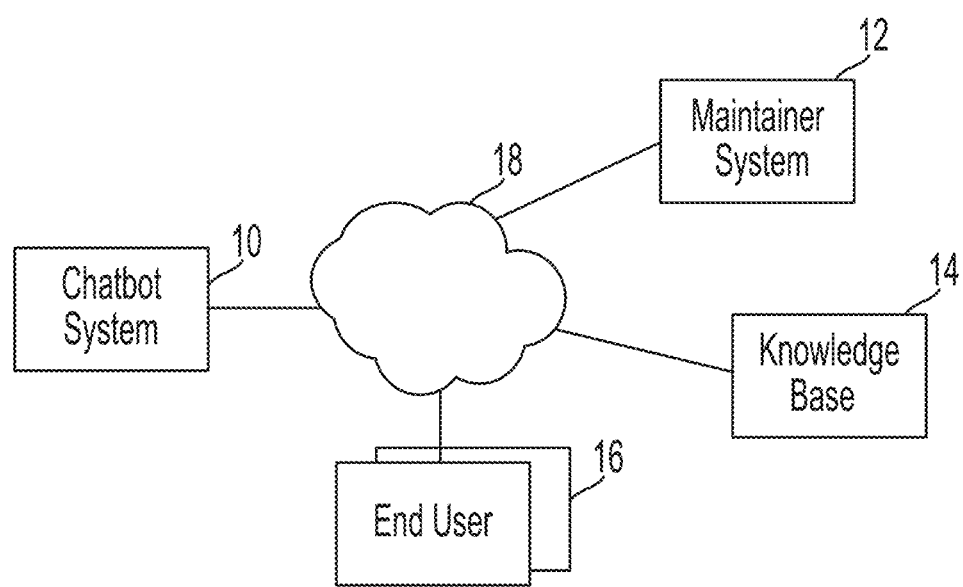
FIG. 1 is a block diagram of a network environment including a chatbot system, a maintainer system, a knowledge base, and an end user device, according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A business may employ an automated question answering system, a chat bot, a chat robot, a chatterbot, a dialog system, a conversational agent, and/or the like (collectively referred to as a chatbot or chatbot system) to interact with customers. Customers may use natural language to pose questions to the chatbot, and the chatbot may provide answers that are aimed to be responsive to the questions. The quality or responsiveness of the answers may depend on the training received by the chatbot. If the chatbot's training is insufficient to properly answer a user's question, it may lead to decreased customer satisfaction. Also, the longer it takes for the chatbot to understand and answer user queries, the more prolonged the use of computer resources to handle the interaction.

Training and maintaining chatbots, however, can be an arduous task. In one example, a chatbot builder or maintainer manually defines a set of questions in a semantic space. The semantic space may be defined as all known and unknown queries that could be presented to the chatbot. The chatbot maintainer may further define the answers to the queries, and use the question-answer pairs to train and/or retrain the chatbot.

In one embodiment, the queries in the semantic space may be organized or grouped into one or more topics, categories, or intents. For example, the queries "How do I get my money back?", "What's your refund policy?", can both be grouped into a "refund" topic.

The topic may be used to generate an answer to the queries that are grouped into the topic. It may be the chatbot maintainer's goal to create enough answers to cover the semantic space. If the semantic space is fully covered, then all possible user queries will belong to some answer, and the chatbot may always be able to provide a response.

As a knowledge space including queries, and associated topics and answers grow, it may be difficult for chatbot maintainers to remember and/or find the information contained in the knowledge space. This may lead to problems such as duplicate answers, missing information, or the like. The problems may remain undetected as the data in the knowledge base grows and becomes more complex.

In general terms, embodiments of the present disclosure are directed to systems and methods for visualizing problem areas in the data maintained in a knowledge base. The data may be used to train the chatbot to automatically recognize an intent of an incoming query based on example queries in the knowledge base, and provide an appropriate response to the incoming query.

In one embodiment, the data in the knowledge base is represented in a network graph. Topics or answers in the knowledge base may be represented as nodes of the graph. An edge may connect a first and a second node of the graph if the answer represented by first node is likely to be confused with the answer represented by the second node, or vice versa. The graph may also be referred to as a confusion graph.

In one embodiment, the edge connecting the first and second nodes is a directed edge indicating the direction of the confusion. In one embodiment, a direction of the edge from the first node to the second node indicates a confusion of the answer represented by the first node, with the answer represented by the second node.

The confusion between a first answer and the second answer may be based on semantic similarity of the example queries associated with the answers. In one embodiment, given a pair of answers A and B, answer A is deemed to be confused with answer B, if any of the example queries that have been assigned to A are more semantically similar to the example queries assigned to B, than they are to other example queries assigned to answer A. In this case, a directed edge may connect a node representing answer A, to the node representing answer B.

In one embodiment, the confusion graph may provide other visual indications, other than the directed arrow, for the confusion between a pair of answers. For example, the color and/or thickness of the directed edge may change based on an amount of confusion between the two answers. A number may also be displayed indicating the actual amount of confusion between the two answers.

The confusion graph may also visually highlight other problems in the data maintained in the knowledge base. For example, the shape of the node representing an abnormal answer (e.g., an answer with one example query) may be shown in the graph using a shape and/or color different from the shape and/or color of other nodes representing normal answers. In some embodiments, the confusion graph may further include queries in the knowledge base that have not been assigned to an answer. Such unassigned queries may be depicted in the graph using a shape that may differ from the shape of answer nodes. The color of the unassigned queries may further be the same as the color of the edges that depict confusion. The use of the same color may allow an at-a-glance identification of problems with the data.

The confusion graph may also provide information of other potential problems with the example queries and/or associated answers. For example, hovering a mouse or other pointer device over an answer node in the graph may cause display of information about the answer, including information of the example queries associated with the answer. The information may identify example queries that cause a confusion with another answer, and/or example queries that are deemed to be outliers in the answer group when compared to other example queries in the group. In one embodiment, a potential solution may be automatically recommended and/or implemented, based on the identified potential problem. For example, if an example query is flagged as an outlier, the recommendation may be to add more questions to the answer, merge the questions in the answer with questions in another answer, or delete the outlier question.

FIG. 1 is a block diagram of a network environment including a chatbot system 10, a maintainer system 12, a knowledge base 14, and an end user device 16, according to one embodiment. The chatbot system 10, maintainer system 12, knowledge base 14, and end user device 16 may be coupled to one another over a data communications network 18. The data communications network 18 may a local area network, private wide area network, and/or public Internet.

In one embodiment, the chatbot system 10 is configured to handle interactions with the end user device 16. The chatbot system 10 may be configured to handle interactions on behalf of a particular business or enterprise, or on behalf of multiple businesses or enterprises. For example, a separate instance of a chatbot system 10 may be provided for each separate enterprise for handling interactions of that enterprise.

The end user device 16 may be a desktop, laptop, and/or any other computing device conventional in the art. A customer, potential customer, or other end user (collectively referenced as an end user) desiring to receive services from the enterprise may initiate communications to the chatbot system 10 using the end user device 16. For example, the end user may formulate a query, and transmit the query to the chatbot system 10 as a chat message, text message, social media message, and/or the like. The chatbot system 10 may process the query and determine a user intent. One or more machine learning models may be invoked for predicting the user intent Once the intent is determined, the chatbot may output an answer in response to the query. The one or more machine learning models, and software and hardware for interfacing with the end user devices 16, may generally be referred to as a chatbot.

In one embodiment, the maintainer system 12 may include a computing system for access by a chatbot maintainer for generating (e.g., configuring and training) and maintaining (e.g., retraining) the chatbot system 10 for a particular enterprise. The computing system may be a desktop computer, laptop computer, network server, mobile device, embedded computer, and/or the like. The maintainer system 12 may be accessed by, for example, the chatbot maintainer to train one or more machine learning models (referred to as inference models) of the chatbot system 10.

In one embodiment, the chatbot is trained using training questions and associated answers (collectively referred to as training data). The training data may pertain to a single enterprise, a plurality of enterprises associated with a single industry vertical, or a plurality of enterprises associated with a plurality of industry verticals.

In one embodiment, the training data is stored in the knowledge base 14. The knowledge base 14 may include a database or another type of data repository for storing the training data. Although the knowledge base 14 is depicted in FIG. 1 as a separate system accessible over the data communications network 18, the various embodiments are not limited thereto, and the knowledge base 14 may be part of the chatbot system 10, the maintainer system 12, or another system of the network environment of FIG. 1.

The question-answer training data for training the chatbot may be generated manually, automatically, or semi-automatically. For example, the chatbot maintainer may manually define a set of questions and appropriate answers to the questions via the maintainer system 12, and use the question-answer pairs to train the chatbot. Manually generating the training questions, however, may require creativity or experience in the domain. For example, the chatbot maintainer may attempt to identify different topics and associated example queries that belong to the topic that might be presented to the chatbot. The chatbot maintainer may use the topics and the example queries to create answers that are responsive to the queries.

One or more of the training questions may also be generated automatically or semi-automatically by the chatbot system 10. For example, the chatbot system 10 may automatically generate and recommend training questions and associated answers, and the chatbot maintainer may use the recommended question-answer pairs to train or retrain (collectively referred to as train) the chatbot. The automatic generating and recommending of training questions may be as described in U.S. patent application Ser. No. 17/889,186, filed on Aug. 16, 2022, entitled "Systems and Methods for Generating a Chatbot," the content of which is incorporated herein by reference.

Training data may also be generated by the chatbot system 10 as the system is used over time. For example, a user query that is submitted by the end user device 16 that is not recognized by the chatbot may be provided to the chatbot maintainer for further analysis. The chatbot maintainer may review the unrecognized user query and generate an appropriate response. The query-response pair may then be stored as training data to further train the chatbot.

As the knowledge base 14 grows and becomes more complex, it may be challenging for the chatbot administrator to understand all the questions and answers in the knowledge base 14. The lack of full understanding may lead to problems such as duplicate answers, missing information, and/or the like.

In one embodiment, the chatbot system 10 is configured to process the training data in the knowledge base 14, and represent the data in a graph. The graph may be configured to depict potential problems with the training data. The visual depiction of the potential problems may allow the chatbot administrator to identify problems relatively quickly to take appropriate actions.

Figure 2:
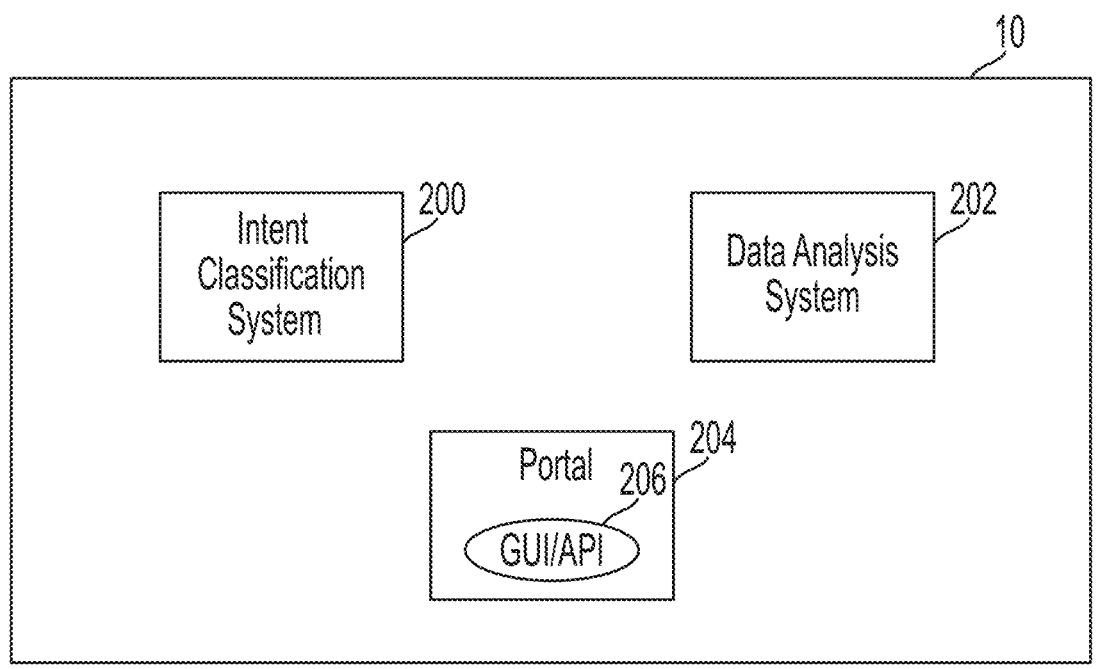
FIG. 2 is a block diagram of the chatbot system according to one embodiment.

FIG. 2 is a block diagram of the chatbot system 10 according to one embodiment. The chatbot system 10 may include, without limitation, an intent classification system 200, a data analysis system 202, and an administrator portal 204. The intent classification system 200 may include one or more machine learning models (referred to as inference models) that are trained to identify a user intent based on a user query. For example, the intent classification system 200 may receive queries that may be found in a company's frequently asked questions (FAQ) page, although embodiments are not limited thereto. Such questions may include, for example, "How do I cancel my account," "How do I make a return," "How do I make a payment," "How do I check my order status," or the like. The intent classification system 200 may receive the query and predict a user intent associated with the query. In the given example queries, the associated intents may respectively be "cancel account," "make returns," "make payments," and "order status."

The inference models used by the intent classification system 200 may include, for example, deep neural networks, shallow neural networks, and the like. The neural network(s) may have an input layer, one or more hidden layers, and an output layer. One or more of the neural networks may generate one or more embeddings (also referred to as features) from the user query. In one embodiment, the intent classification system 200 is configured to extract embedding features from the embeddings. The intent classification system 200 may use the extracted embedding features to predict a user intent. The predicted user intent may be used to identify an answer to the user query, for being returned to the requesting user.

In one embodiment, the data analysis system 202 is configured to analyze the training data in the knowledge base 14, and identify potential problems with the data. The data analysis system 202 may further be configured to train the machine learning models of the intent classification system 200.

In one embodiment, the data analysis system 202 is configured to identify potential confusions in the answers associated with example queries. A potential confusion may exist between a first answer and a second answer if a query that belongs to the first answer is predicted to be answered by the second answer. The confusion determination may be based on determining that a query that has been assigned to the first answer is more semantically similar to a query that has been assigned to the second answer, than it is to another query that has been assigned to the first answer.

The data analysis system 202 may flag the queries assigned to an answer that may be the source of confusion, and further compute a ratio of such queries to a total number of queries assigned to the answer. The data analysis system 202 may also flag other queries and/or answers or topics that are identified as problematic. For example, the data analysis system 202 may flag answers associated with a low number of user queries (e.g., one), and/or queries that are not assigned to an answer.

The data analysis system 202 may further flag a query assigned to an answer that is semantically dissimilar to other queries assigned to the answer. A query may be deemed to be semantically dissimilar if the semantic similarity score between the query and each of other queries assigned to the answer, is below a threshold. In this case, the query may be flagged as an outlier.

In one embodiment, the data analysis system 202 provides recommendations as to actions that may be taken to address the identified problems. Depending on the problem, the recommendation may be to move a query from one topic to another topic, add more queries to a topic, delete a query from a topic, and/or the like. A recommended action may be automatically implemented. For example, detecting selection of a recommended action to move a query from a first topic to a second may cause the data analysis system 202 to remove an association of the query from the first topic (further causing removal of the association to the answer corresponding to the first topic), and add an association of the query to the second topic (further causing addition of the association to the answer corresponding to the second topic).

In one embodiment, the data analysis system 202 is configured to visually represent the training data in the knowledge base 14, and visually highlight potentially problematic areas of the data. The visualizing of the data in this manner may allow the chatbot administrator to quickly determine an overall health of the chatbot system and address the problematic areas of the data.

In one embodiment, the visual representation is a network graph. The nodes of the graph represent answers for various query topics. A directed edge may connect a first node to a second node, if the answer represented by the first node is likely to be confused with the answer represented by a second node, for one or more queries of the first node.

The directed edge connecting two nodes of the graph may indicate a source of the confusion. The edge may be represented with a color that is different from other objects in the graph for visually distinguishing the edge from the other objects. The thickness of one edge may also differ from the thickness of another edge, depending on an amount of confusion of the nodes connected by the respective edge. For example, the greater the ratio of queries for a topic that cause confusion to a total number of queries for the topic, the thicker the edge.

In one embodiment, the graph further displays queries and/or answers that may have potential problems other than potential confusion. For example, an answer for a topic that contains only a single query may be visually highlighted in the graph as problematic (e.g., by changing the shape and/or color of the answer node). In another example, a query that has not been assigned to a topic or answer may also be visually depicted in the graph as problematic (e.g., by displaying the query in the graph via a preset shape and/or color).

In one embodiment, selecting, hovering over, or pointing to a node may cause the data analysis system 202 to display information about the topic and/or queries associated with the answer that is represented by the node. For example, if the node contains a query for which the answer is confused with the answer of another node, the query may be visually highlighted (e.g., depicted with a strikeout). Queries that are deemed to be outliers for the topic may also be visually highlighted (e.g., depicted with a color different from the color of other queries).

In one embodiment, the administrator portal 204 of the chatbot system 10 provides a GUI or an application programming interface (API) (collectively referenced as GUI) 206 that may be accessed by the maintainer system 12. The access of the portal 204 may be via the Internet using, for example, a web browser or the API.

In one embodiment, the GUI 206 causes display of the graph for visually highlighting, to the chatbot maintainer, potential confusions of the answers and other problems with the training data. The GUI 206 may further cause display of other information about the queries and/or answers in the knowledge base 14, together or separately from the graph. Recommended actions for solving a potential problem with the training data may also be provided via the GUI 206.

In one embodiment, the chatbot administrator may interact with the graph and/or with other information provided by the GUI 206. The interaction may be, for example, to zoom-in or out of the graph to display the graph with varying granularity, select nodes for which additional information is desired, select a recommended action for fixing a problem with the training data, and/or the like.

Figure 3:
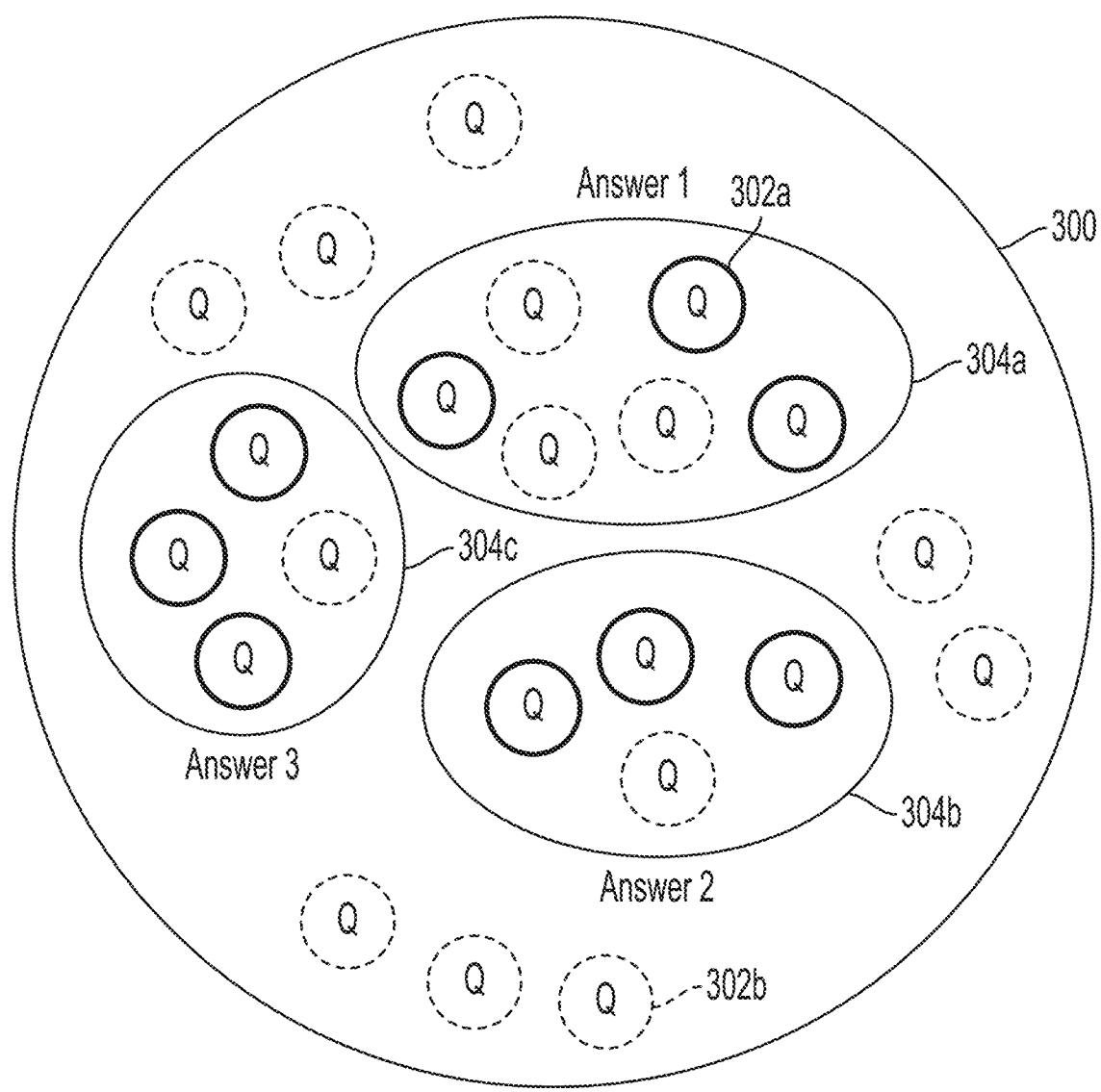
FIG. 3 is a schematic diagram of a semantic space including one or more known and unknown queries that may be presented to the chatbot for a response according to one embodiment.

FIG. 3 is a schematic diagram of a semantic space 300 including one or more known and unknown queries 302a, 302b (collectively referenced as queries) that may be presented to the chatbot for a response according to one embodiment. The known queries 302a may be training queries manually generated by the chatbot maintainer, queries provided by an end user interacting with the chatbot system 10, or queries automatically generated by the chatbot system 10. The unknown queries 302b may be queries that may be identified later at a future date.

The queries 302 may be organized into topics or answers 304a-304c (collectively referenced as 304). Queries about one topic may be more semantically similar than queries about a different topic. In this regard, the queries about a single topic may be located closer to each other in the semantic space 300 than queries about the different topic. A topic may be, for example, "Questions about Refunds," and example queries that belong to the topic may be "How do I get my money back?" or "What's your refund policy?"

Figure 4:
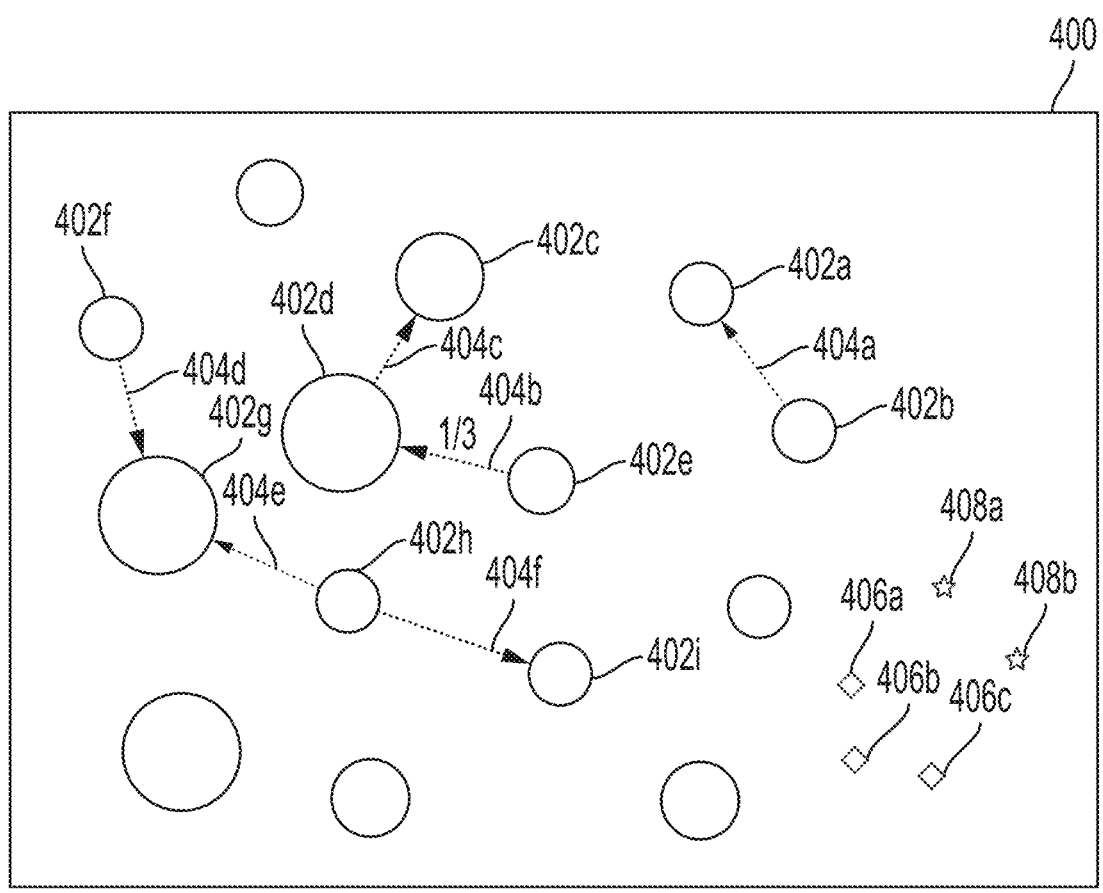
FIG. 4 is a conceptual diagram of a network graph according to one embodiment.

FIG. 4 is a conceptual diagram of a network graph 400 provided by the GUI 206 for display on the maintainer system 12 according to one embodiment. The network graph 400 may be generated based on analysis of the training data, including the semantic similarity analysis of the queries that make up the training data by the data analysis system 202.

The network graph 400 may include one or more nodes 402a-402i (collectively referred to as 402) representing training answers or topics (collectively referred to as answers) in the knowledge base. For example, a node may represent a topic or answer 304 in the semantic space 300, and may further be associated with queries that are assigned to the topic or answer. The queries that are assigned to the topic or answer may be referred to as belonging to the node 402. The size of a node 402 of the graph 400 may depend on the number of queries that belong to the node. In the example of FIG. 4, node 402*f* is smaller than node 402*g*, indicating that there are more queries that belong to node 402*g* than node 402*f*.

In one embodiment, an answer in the knowledge base 14 that has at least a minimum number of queries (e.g., 2 or more queries) assigned to the answer is visually represented in the graph 400 as a node using a first shape. If the answer contains less than the minimum number of queries (e.g., one query), the answer may be depicted using a second shape 408*a*-408*b* different from the first shape.

A directed edge 404*a*-404*f* (collectively referred to as 404) may connect a first node (e.g., node 402*e*) representing a first answer, to a second node (e.g., node 402*d*) representing a second answer, if the first answer may be confused with the second answer. The first answer may be confused with the second answer if the first node contains a query that may be confused as belonging to the second node.

In one embodiment, the directed edge depicts a direction of the confusion. For example, a directed edge from the first node to the second may indicate that the first node (first answer) is confused with the second node (second answer). Although a directed edge is used to depict the direction of the confusion, a person of skill in the art should understand that other mechanisms may be used to visually depict the existence and/or direction of the confusion.

In some embodiments, the edge is visually highlighted by using, for example, a color for the edge that is different from the color of the nodes. The different colors may allow a chatbot maintainer to easily identify areas of the graph where confusion may exist.

In some embodiments, the thickness of the edges may indicate an amount of confusion. In the example of FIG. 4, edge 404*d* is thicker than edge 404*e*, indicating that there are more queries in node 402*f* that can be confused as belonging to node 402*g*, than there are queries in node 402*h* that can be confused as belonging to node 402*g*. A ratio of the queries that create the confusion to a total number of queries may also be displayed near the edge 402. For example, hovering a pointer device over edge 404*b* may show that 1 out of 3 queries that belong to node 402*e* can be confused with node 402*d*.

In some situations, queries of a node may be confused as belonging to multiple nodes. For example, one or more first queries of node 402*h* may be confused as belonging to node 402*i*, and one or more second queries of node 402*h* may be confused as belonging to node 402*g*. Nodes 402*g*, 402*h*, and 402*i* that are linked together via directed edges 404*e* and 404*f* may be referred to as a community. In one embodiment, the data analysis system 202 employs a graph algorithm for identifying communities for the graph 400. Communities may be visually highlighted for alerting the chatbot maintainer to evaluate and regroup the queries and/or answers of the nodes in the community for avoiding the multiple confusion. In one embodiment, the evaluation and regrouping may be manually performed by the chatbot maintainer. In one embodiment, the data analysis system 202 may automatically evaluate the communities and recommend a proposed regrouping to the chatbot administrator.

In one embodiment, other data flagged by the data analysis system 202 may be displayed in the graph 400 in a visually distinguished manner. For example, unassigned queries flagged by the data analysis system 202 as not yet assigned to a topic or answer may be identified using a first shape 406*a*-406*b*.

Figure 5:
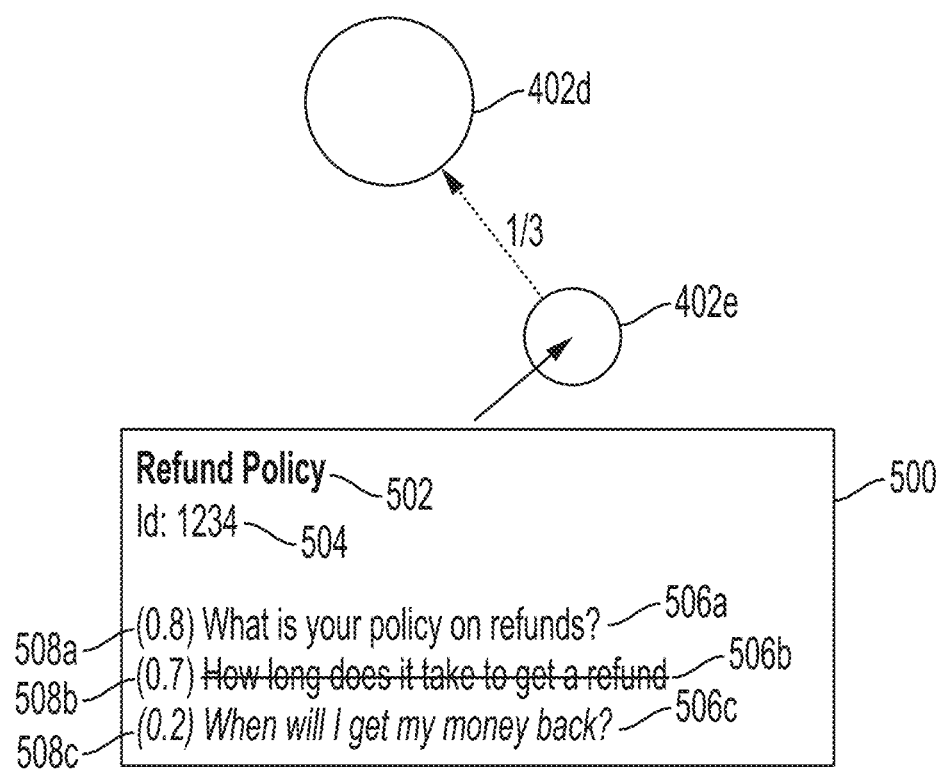
FIG. 5 is a diagram of additional information that may be displayed for a node in the network graph of FIG. 4 according to one embodiment.

FIG. 5 is a diagram of additional information 500 that may be displayed for a node in the network graph 400 according to one embodiment. The additional information 500 may be displayed, for example, in a separate pop-up display area, in response to the chatbot maintainer selecting or hovering over the node (e.g., node 402*e*), with a pointer device.

The displayed information 500 may include, without limitation, a topic 502 of queries 506*a*-506*c* (collectively 506) that is to be answered by the answer represented by the node 402*e*. A unique identifier (ID) 504 may further identify the topic 502.

In one embodiment, the additional information displayed for the node includes the text of queries 506 that belong to the topic 502. A semantic similarity score 508*a*-508*c* (collectively referred to as 508) that is computed by the data analysis system 202 based on the semantic relationship between one query and other queries belonging to the topic may also be displayed. The similarity score 508 may be, for example, an average of the similarity scores computed between the one query and each of the other queries. In one embodiment, the similarity score 508 represents semantic similarity of the text for a pair of queries being analyzed. According to this embodiment, the higher the semantic similarity, the higher the semantic similarity score.

In embodiment, a query (e.g., query 506*c*), that has a similarity score (e.g., similarity score 508*c*) that is below a minimum threshold is visually highlighted. The similarity score may be indicative of an average semantic similarity of the query to other queries that belong to the answer. The visual highlighting may be by displaying the query 506*c* with a color different from the color of the other queries (e.g., queries 508*a*-508*b*).

In one embodiment, queries that may cause one node (e.g., node 402*e*) to be confused with another node (e.g., node 402*d*) may also be visually highlighted. In the example of FIG. 5, query 506*b* "How long does it take to get a refund," is flagged by the data analysis system 202 as being a query that causes the confusion of node 402*e* with node 402*d*. The query 506*b* associated with the confusion may be visually highlighted by displaying the text of the query with a strikethrough.

Figure 6:
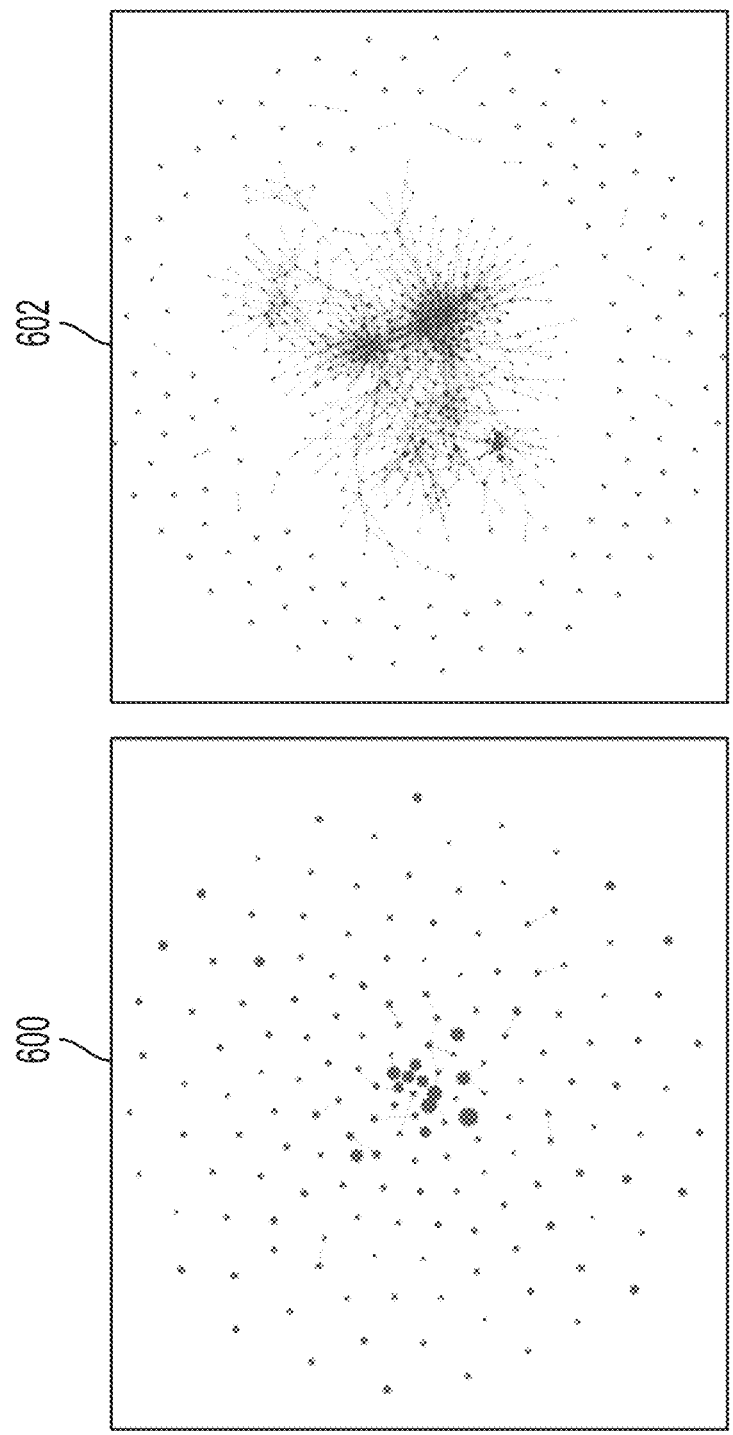
FIGS. 6A and 6B are diagrams of example network graphs generated by a data analysis system based on data in a knowledge base according to one embodiment.

FIGS. 6A and 6B are diagrams of example network graphs 600, 602 generated by the data analysis system 202 based on data in the knowledge base 14 according to one embodiment. The graphs may help provide an at-a-glance view of the health of the data in the knowledge base 14. In the example of FIGS. 6A-6B, example graph 600 has less directed edges than example graph 602, indicating that there are more potential problems with the data associated with graph 602 than there is with data associated with graph 600. The distinctive color of the edges may also help quickly direct the chatbot maintainer to the area of the problem.

In one embodiment, the GUI 206 may allow an ability to zoom-in to a region of the graph 600, 602. When zoomed-out, one or more details of the graph (e.g., size of the nodes, shapes of the nodes, direction of the edges, etc.) may be hidden. When zoomed-in, one or more details of the graph may become visible.

FIG. 7 is a table 700 of example semantic similarity scores computed by the data analysis system 202 for determining whether answer A may be confused with answer B according to one embodiment. In one embodiment, the data analysis system 202 performs semantic similarity computations for all pairs of answers in the knowledge base 14 for determining whether one answer in the pair may be confused with the other answer.

In the example of FIG. 7, answer A contains three queries (A1, A2, and A3), and answer B contains three queries (B1, B2, and B3). In determining whether answer A may be confused with answer B, the data analysis system 202 computes a semantic similarity score of each query 702a-702c assigned to answer A, to other queries 704a-704b assigned to answer A, as well as a semantic similarity score of each query assigned to answer A 702a-702c to queries 706a-706c assigned to answer B.

In the example table 700 of FIG. 7, the similarity score between query A1 702a and query B3 706c is 0.8, which is larger than the similarity score between the query and any of the queries assigned to answer A (e.g., between query A2 704a or query A3 704b). Thus, query A1 702a may be identified as being more semantically similar to query B3 706c, than to the other queries 704a, 704b assigned to answer A. The data analysis system 202 may thus flag answer A as confused with answer B.

In one embodiment, the process of computing the semantic similarity of two queries may include converting, by the data analysis system 202, the text of each query into embeddings. The embeddings may be word and/or sentence embeddings that represent one or more words of the user query as numerical vectors that encode the semantic meaning of the query. In this regard, the embeddings may also be referred to as semantic representations. In one example, the embeddings may be represented as a vector including values representing various characteristics of the word(s) in the query, such as, for example, whether the word(s) is a noun, verb, adverb, adjective, etc., the words that are used before and after each word, and/or the like. The embeddings may represent the location of the text of the query in a high-dimensional semantic space. For example, the semantic space may have 1024 dimensions.

In one embodiment, the embeddings may be generated by a language model such as, for example, a Bidirectional Encoder Representations and Transformers (BERT) model. In some embodiments, the language model may be fine-tuned in a multi-task setting. For example, the model may be fine-tuned by adjusting values of one or more learnable parameters of the language model for a particular task. In some embodiments, a deep neural network that has been fine-tuned based on user queries may be used to generate the embedding vectors, in addition or in lieu of the BERT model.

In one embodiment, the data analysis system 202 may compute a distance between two embedding vectors for determining the semantic similarity between the corresponding queries. In this regard, the embeddings of the two queries may be designed so that the more semantically similar the text of the queries, the closer the semantic distance of the corresponding embeddings in the high-dimensional semantic space. In one embodiment, the semantic distance of a pair of embeddings may be based on a cosine similarity distance computation of the pair of embeddings, although embodiments are not limited thereto. In one embodiment, the semantic similarity score is inversely proportional to the computed semantic distance.

Figure 8:
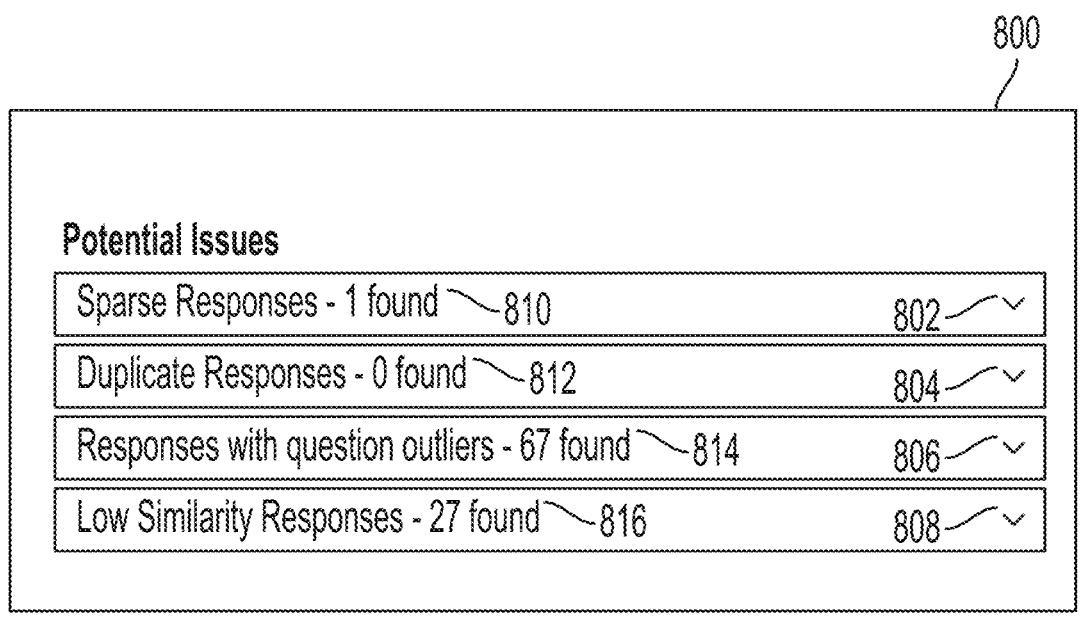
FIG. 8 is a screen shot of an example screen for displaying details of the potential issues identified by a data analysis system according to one embodiment.

FIG. 8 is a screen shot of an example screen 800 generated by the GUI 206 for displaying details of the potential issues identified by the data analysis system 202 according to one embodiment. The details may be displayed concurrently with, or separately from, the confusion graph 600, 602.

In one embodiment, the screen includes one or more issue categories 802-808 displayed as headings of a drop-down list. One or more of the issue categories 802-808 may identify a number of answers 810-816 that are flagged by the data analysis system 202 as containing the displayed issue.

In the example of FIG. 8 an answer may be flagged for a "sparse response" issue 802 based on the answer having less than a minimum number of queries (e.g., less than two queries). An answer may be flagged for a "duplicate response" issue 804 based on a determination that all the queries belonging to the answer are confused as being belonging to a different answer. An answer may be flagged for an "outlier" issue 806 based on a determination that at least one query that belongs to the answer may be deemed to be an outlier. In this regard, a query may be deemed to be an outlier if the semantic similarity score (e.g., an average semantic similarity score) between the query and other queries belonging to the answer, is less than a minimum threshold similarity score.

An answer may be flagged for a "low similarity" issue 808 if all the queries that are associated with the answer are semantically distinct. For example, the queries may be deemed to be semantically distinct if a semantic similarity score between any pair of queries of the answer is less than a threshold semantic similarity score.

In one embodiment, in response to detecting selection of one of the issues 802-808, the GUI 206 may cause the display of additional information associated with the selected issue. For example, details of the selected issue may be retrieved for display. A recommended action on how to solve the issue may also be retrieved for display.

Figure 9A:
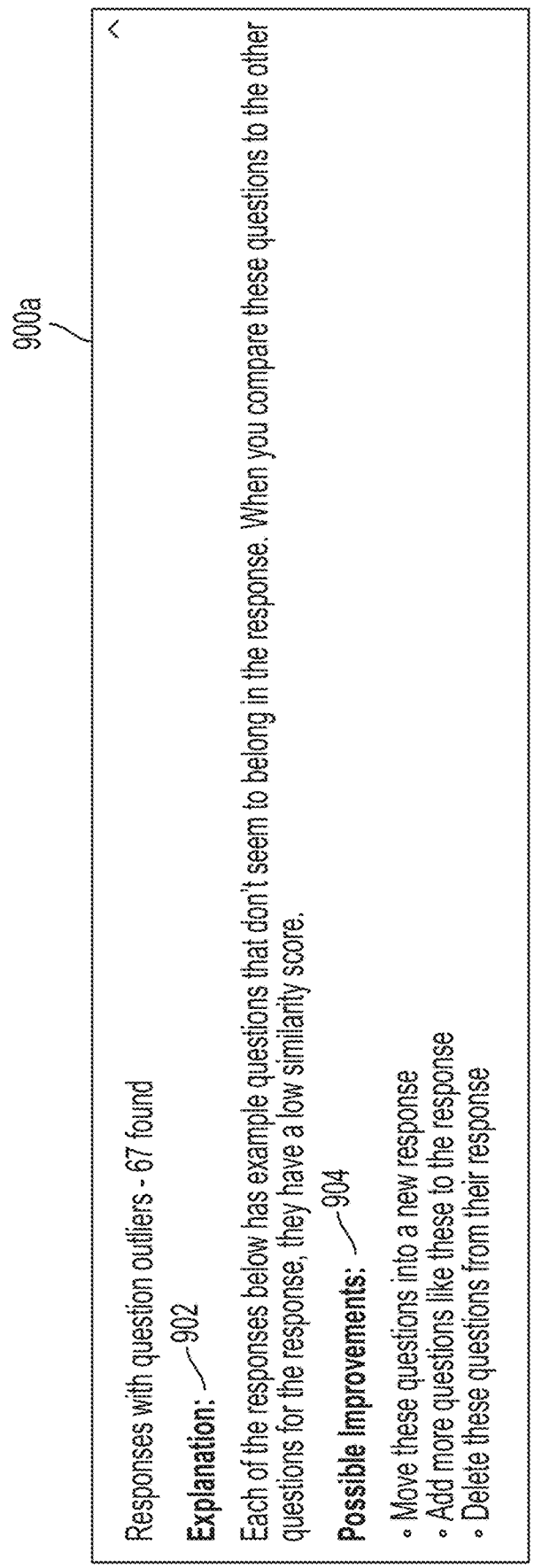

FIGS. 9A-9B are screen shots of example screens 900a, 900b generated by the GUI 206 for displaying additional details for a selected issue 802-808 according to one embodiment. The GUI 206 may retrieve a description of the issue for display on an explanation section 902 of the screen. The GUI 206 may further retrieve recommended action(s) to take to solve the issue, and cause display of the recommended action(s) in an improvements section 904 of the screen. In some embodiments, selection of a particular improvement displayed on the improvements section 904 may cause the data analysis system 202 to automatically or semi-automatically implement the improvement. For example, if the improvement is to move a query associated with a current answer to another answer, the data analysis system 202 may automatically identify the new answer to which the query is to be moved. For example, the new answer may be one that has queries that are semantically similar to the query to be moved. The identified new answer may be recommended to the chatbot maintainer, and if approved, the data analysis system 202 may automatically associate the query to the new answer.

In some embodiments, the GUI 206 may further cause display of a list of answers 906 that have been flagged by the data analysis system as containing the issue. Selection of a particular answer 906a may further cause display of queries 908 associated with the selected answer. In some embodiments, the query 908a that caused the issue may be visually highlighted.

Figure 10:
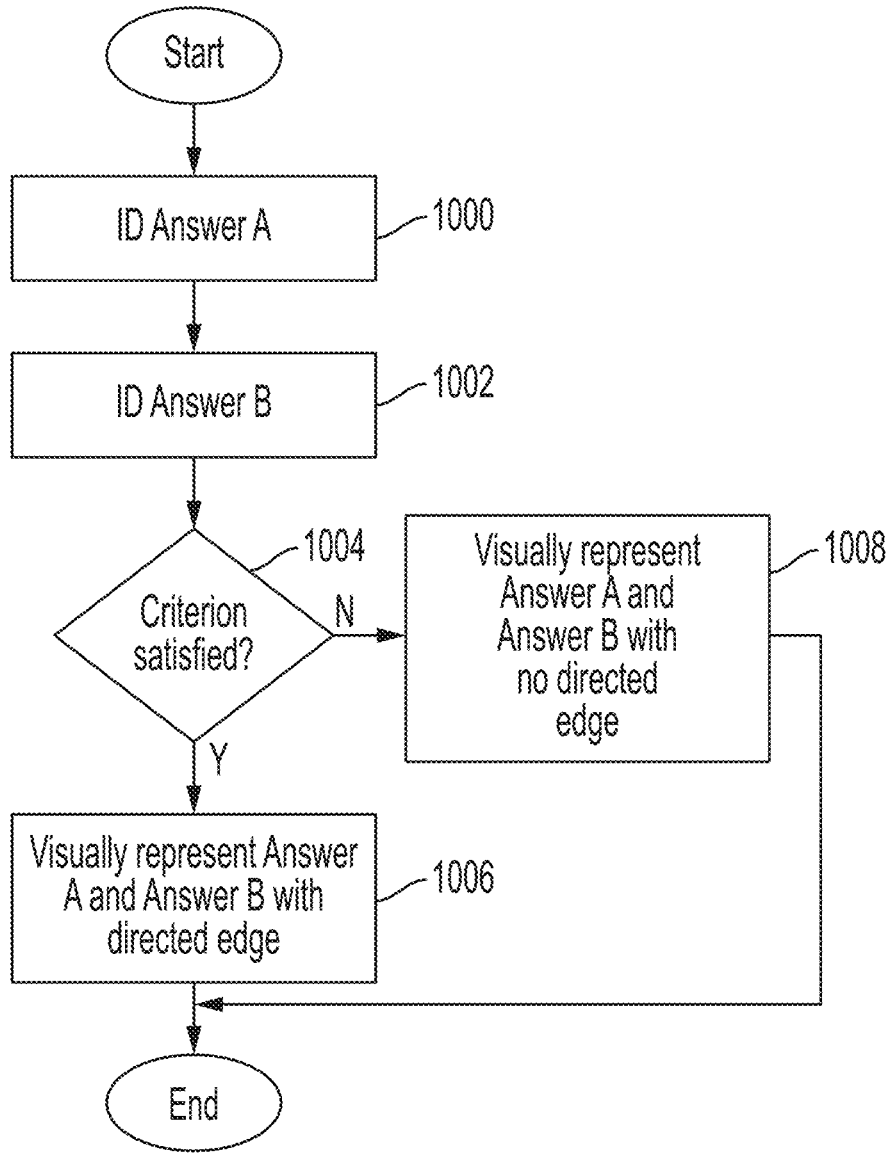
FIG. 10 is a flow diagram of a process for visualizing data of a chatbot system according to one embodiment.

FIG. 10 is a flow diagram of a process for visualizing data of a chatbot system according to one embodiment. The data analysis system 202 may analyze training data in the knowledge base 14, and identify, in act 1000, a first answer (Answer A) associated with one or more first training queries.

In act 1002, the data analysis system 202 also identifies a second answer (Answer B) associated with one or more second training queries.

In act 1004, the data analysis system 202 determines a criterion of the first answer with respect to the second answer, and determines whether the criterion has been satisfied. The criterion may be whether the first answer is predicted to be confused with the second answer for any of the queries belonging to the first answer. The confusion may be determined by computing a semantic similarity score of a query (A1) belonging to the first answer to other queries (e.g., A2, A3, etc.) in the first answer (Answer A), and comparing the semantic similarity scores to the semantic similarity scores of the query (A1) to queries (e.g., B1, B2, B3, etc.) in the second answer (Answer B). The criterion (e.g., existence of the potential confusion) may be deemed to be satisfied if there is a query in the first answer (Answer A), that is more semantically similar to a query in the second answer (Answer B), than it is to queries in the first answer (Answer A).

Based on the determination that the criterion has been satisfied, the data analysis system 202 and/or GUI 206 may visually represent, in act 1006, the first answer (Answer A) connected to the second answer (Answer B) via a directed edge. For example, the first and second answers may be represented as nodes of a network graph, and the directed edge may connect the node representing the first answer to the node representing the second answer for indicating the direction of the confusion.

If the criterion has not been satisfied, the data analysis system 202 and/or GUI 205 may visually represent, in act 1008, the first answer and the second answer without the directed edge.

In one embodiment, the process of FIG. 10 is performed by the data analysis system 202 for all pairs of answers in the knowledge base 14 for visually representing possible confusions in the answers.

Figure 11:
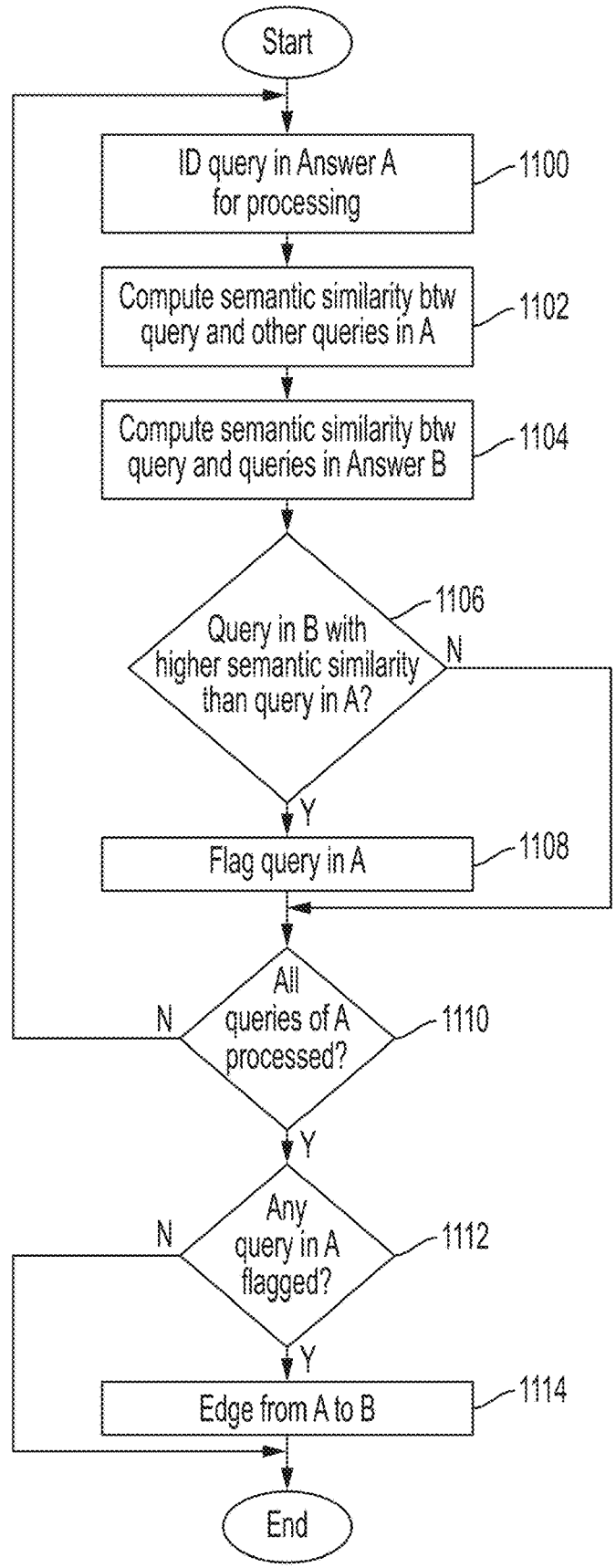
FIG. 11 is a flow diagram of a process for determining whether a criterion has been satisfied with respect to a first answer and a second answer according to one embodiment.

FIG. 11 is a flow diagram of a process for determining whether the criterion of act 1004 has been satisfied with respect to the first answer (Answer A) and the second answer (Answer B) according to one embodiment. The process starts, and in act 1100, the data analysis system 202 identifies a query belonging to a first answer for processing.

In act 1102, the data analysis system 202 computes a semantic similarity score between the query bring processed and one or more other queries in the first answer. In this regard, the data analysis system 202 may generate embeddings for the queries in the first answer. The data analysis system 202 may perform a cosine similarity distance computation based on a pair of embeddings that includes the embeddings generated for the query being processed, and the embeddings generated for one of the other queries in the first answer. A semantic similarity score may be assigned to the pair of embeddings based on the similarity distance computation. For example, the smaller the similarity distance, the higher the semantic similarity score for the pair of embeddings.

In act 1104 the data analysis system 202 computes a semantic similarity score between the query being processed and one or more queries in the second answer. In this regard, the data analysis system 202 may generate embeddings for the queries in the second answer. The data analysis system 202 may perform a cosine similarity distance computation based on a pair of embeddings that includes the embeddings generated for the query being processed, and the embeddings generated for one of the queries in the second answer. A semantic similarity score may be assigned to the pair of embeddings based on the similarity distance computation.

In act 1106, a determination is made as to whether the query being processed has a higher semantic similarity score to a query in the second answer than to queries in the first answer.

If the answer is YES, the data analysis system 202 flags the query being processed in act 1108, for identifying the query as one that may cause confusion of the first answer with the second answer.

In act 1110, a determination is made as to whether all the queries of the first answer have been processed.

If the answer is YES, a determination is made, in act 1112, as to whether there are any queries in the first answer that have been flagged. If the answer is YES, the first answer is identified, in act 1114, as being connected to the second answer via a directed edge, to depict a potential of a confusion of the first answer to the second answer.

It will be appreciated that the systems and methods for visualizing problem areas of a chatbot system according to the various embodiments improve the training of chatbots. Chatbot maintainers may quickly identify potential problem areas in the training data and take corrective action. Better training data may improve intent classification by the chatbots, resulting in more accurate responses by the chatbots to user queries. This may further improve the quality and length of interactions between the chatbots and end users.

In the various embodiments, the terms "interaction" and "communication" are used interchangeably, and generally refer to any real-time and non-real time interaction using, for example, chats, text messages, social media messages, and/or the like.

In one embodiment one or more of the systems, servers, devices, controllers, engines, and/or modules (collectively referred to as systems) in the afore-described figures are implemented via hardware or firmware (e.g. ASIC) as will be appreciated by a person of skill in the art. The one or more of the systems, servers, devices, controllers, engines, and/or modules may also be a software process or thread, running on one or more processors, in one or more computing devices.

Figure 12:
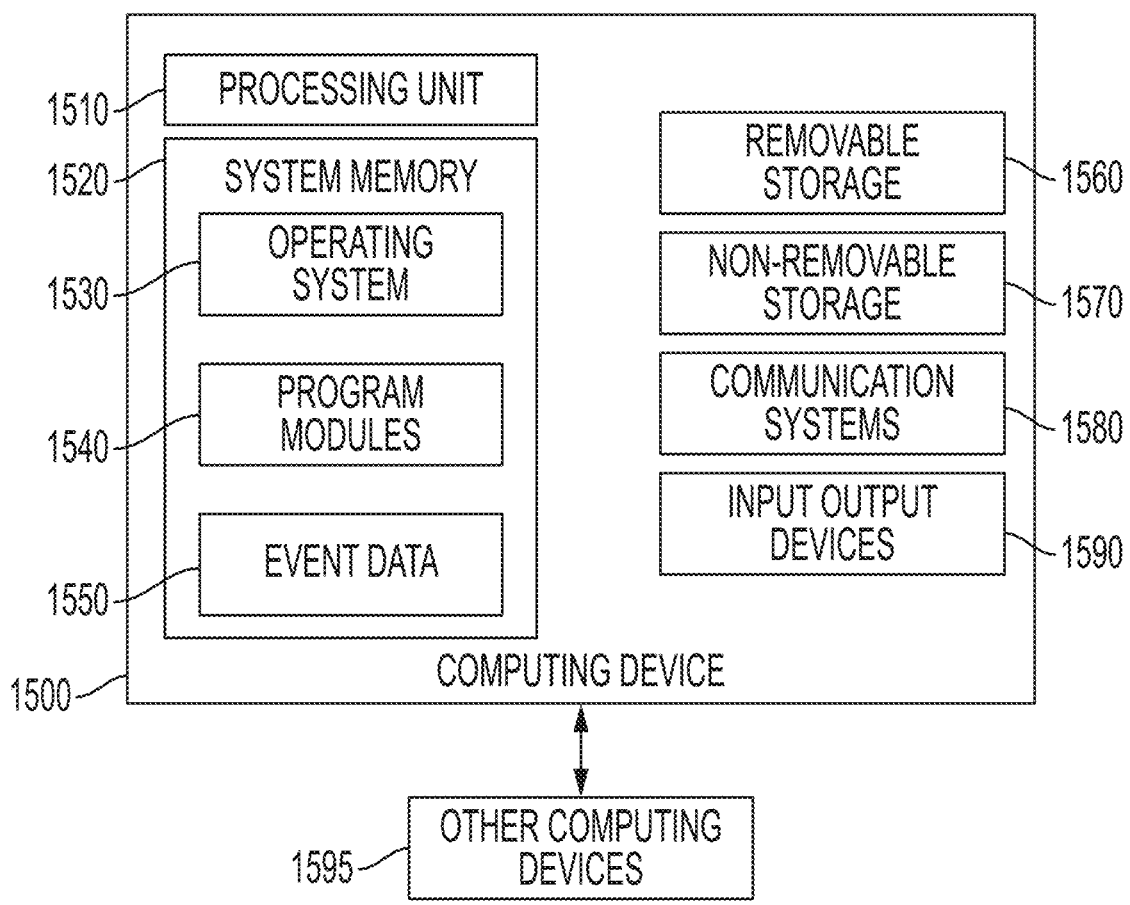
FIG. 12 is a block diagram of a computing device according to one embodiment.

FIG. 12 is a block diagram of a computing device 1500 according to one embodiment. The computing device 1500 may include at least one processing unit (processor) 1510 and a system memory 1520. The system memory 1520 may include, but is not limited to, volatile storage (e.g., random access memory), non-volatile storage (e.g., read-only memory), flash memory, or any combination of such memories. The system memory 1520 may also include an operating system 1530 that controls the operation of the computing device 1500 and one or more program modules 1540 including computer program instructions. A number of different program modules and data files may be stored in the system memory 1520. While executing on the processing unit 1510, the program modules 1540 may perform the various processes described above.

The computing device 1500 may also have additional features or functionality. For example, the computing device 1500 may include additional data storage devices (e.g., removable and/or non-removable storage devices) such as, for example, magnetic disks, optical disks, or tape. These additional storage devices are labeled as a removable storage 1560 and a non-removable storage 1570.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In some embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

According to one embodiment, the computing device 1500 is configured to communicate with other computing devices over a network interface in a network environment. The network environment may be a virtual network environment where the various components of the network are virtualized. For example, the chatbot systems 10, 1458 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIGS. 10 and 11, it should be understood that the sequence of steps of the processes are not fixed, but can be modified, changed in order, performed differently, performed sequentially, concurrently, or simultaneously, or altered into any desired sequence, as recognized by a person of skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for visualizing problem areas of a chatbot system have been specifically described and illustrated herein, many modifications and variations will be apparent to those skilled in the art. Accordingly, it is to be understood that the systems and methods for visualizing problem areas of a chatbot system constructed according to principles of this disclosure may be embodied other than as specifically described herein. The disclosure is also defined in the following claims, and equivalents thereof.

What is claimed is:

1. A method for visualizing data for an automated question answering system, the method comprising:
   identifying a first answer associated with a first query;
   identifying a second answer associated with a second query;
   determining a semantic relationship between the first query and the second query;
   determining a criterion of the first answer with respect to the second answer, wherein the determining the criterion includes determining that the semantic relationship between the first query and the second query is greater than a semantic relationship between the first query and another query associated with the first answer; and
   visually representing the first answer and the second answer based on the criterion.

2. The method of claim 1, wherein the criterion is indicative of the first answer being confused with the second answer.

3. The method of claim 2, wherein the visually representing the first answer and the second answer includes displaying, in a network graph, a first node for the first answer, a second node for a second answer, and a directed edge connecting the first node and the second node, wherein a direction of the directed edge is indicative of a direction of confusion resulting from the first answer being confused with the second answer.

4. The method of claim 2, wherein in response to determining the criterion, recommending an action for addressing confusion resulting from the first answer being confused with the second answer.

5. The method of claim 1, wherein the first query and the second query are for training the automated question answering system.

6. The method of claim 1 further comprising:
   identifying a third query;
   determining that the third query is unassigned to an answer; and
   visually representing the third query based on the determining.

7. The method of claim 1 further comprising:
   identifying a third answer;
   determining a number of queries associated with the third answer; and
   visually representing the third answer based on the determining.

8. A system for visualizing data comprising:
   a processor; and
   a memory, wherein the memory stores instructions that, when executed by the processor, cause the processor to:
   identify a first answer associated with a first query;
   identify a second answer associated with a second query;
   determine a semantic relationship between the first query and the second query;
   determine a criterion of the first answer with respect to the second answer, wherein the instructions that cause the processor to determine the criterion include instructions that cause the processor to determine that the semantic relationship between the first query and the second query is greater than a semantic relationship between the first query and another query associated with the first answer; and
   visually represent the first answer and the second answer based on the criterion.

9. The system of claim 8, wherein the criterion is indicative of the first answer being confused with the second answer.

10. The system of claim 9, wherein the instructions that cause the processor to visually represent the first answer and the second answer include instructions that cause the processor to display, in a network graph, a first node for the first answer, a second node for a second answer, and a directed edge connecting the first node and the second node, wherein a direction of the directed edge is indicative of a direction of confusion resulting from the first answer being confused with the second answer.

11. The system of claim 9, wherein the instructions further cause the processor to, in response to determining the criterion, recommend an action for addressing confusion resulting from the first answer being confused with the second answer.

12. The system of claim 8, wherein the first query and the second query are for training an automated question answering system.

13. The system of claim 8, wherein the instructions further cause the processor to:
    identify a third query;
    determine that the third query is unassigned to an answer; and
    visually represent the third query based on the determining.

14. The system of claim 8, wherein the instructions further cause the processor to:
    identify a third answer;
    determine a number of queries associated with the third answer; and
    visually represent the third answer based on the determining.

* * * * *